Sept. 20, 1949.  F. D. KAISER  2,482,489
INTERWOUND COIL
Filed May 31, 1946
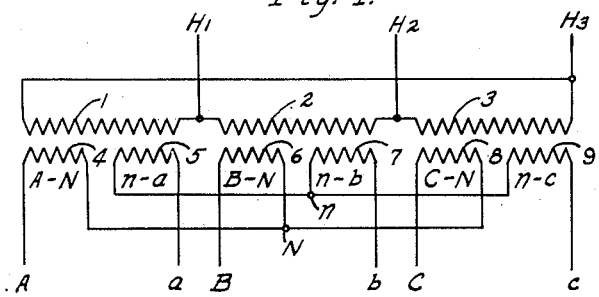
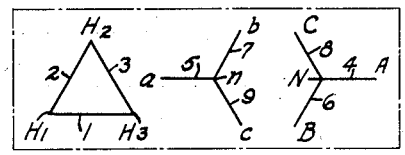
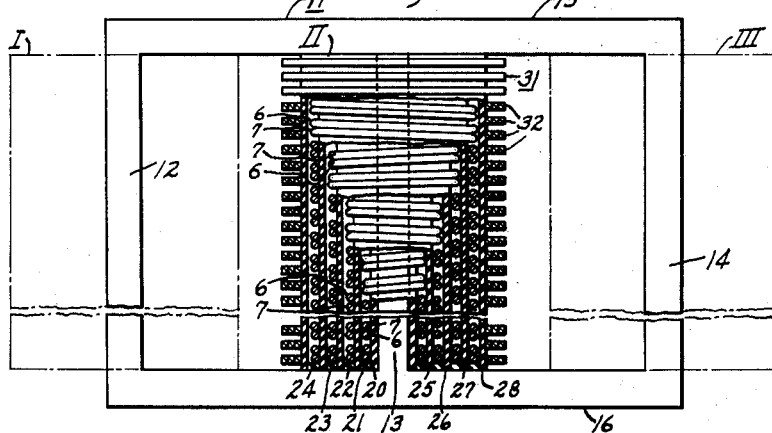
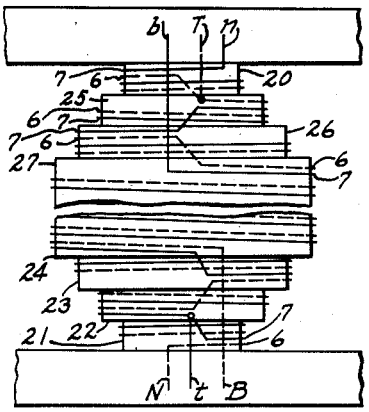
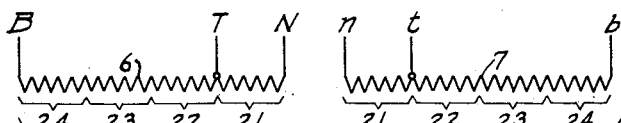
WITNESSES:
Leon M. Harman
Rw. C. Groome
INVENTOR
Francis D. Kaiser.
BY Franklin E. Hardy
ATTORNEY Patented Sept. 20, 1949

2,482,489

UNITED STATES PATENT OFFICE 2,482,489

INTERWOUND COIL

Francis D. Kaiser, Sharon, Pa., assignor to Westinghouse Electric Corporation, East Pittsburgh, Pa., a corporation of Pennsylvania Application May 31, 1946, Serial No. 673,343

13 Claims. (Cl. 175—362)

My invention relates to electrical apparatus such as multi-phase transformers employing a plurality of cylindrical coils on each winding leg of the transformer core.

In accordance with the invention, a multi-phase transformer is provided having concentric primary and secondary windings on each winding leg of the core, the circuit conductor strands comprising the two halves of each phase winding being so wound that close coupling exists between them and equal coupling exists between the primary winding and each half of the secondary winding.

My invention is applicable to a rectifier transformer employed for supplying multi-phase alternating-current power to a rectifier unit, which transformer is provided with a tap connection for obtaining a relatively low voltage for degassing the rectifier, thus making it unnecessary to provide a separate degassing winding on the transformer for this purpose.

My invention is not limited in its application, however, to a rectifier transformer, but may be employed in other applications, such as, for example, to a rotary converter transformer or multi-winding power transformer having reactance characteristics obtainable with the interwound coil arrangement of my invention.

It is an object of the invention to provide, in a transformer of the character described, cylindrical secondary winding coils so interrelated that close coupling exists between the two halves of the secondary winding in each phase, and equal coupling exists between a concentric primary winding and each half of the secondary winding associated therewith.

It is another object of the invention to provide two conductor strands corresponding to the two halves of the secondary winding, the two strands continuing through a plurality of concentric cylindrical secondary coils and being wound as a pair in close proximity turn after turn so that the two strands form two separate helices having the same diameter with the consecutive turns of each strand in a coil being interleaved between adjacent turns of the other one of the pair of strands, and the relative positions of the two strands being reversed as the pair of strands advance from one cylindrical coil to the next, so that the relative position of each strand, with respect to the other strand of the pair is interchanged in each successive coil of the winding. This interchange of the positions of the strands balances the axial displacement that exists between the total turns of the two strands of the pair.

It is a further object of the invention to provide a transformer of the character indicated above in which a plurality of concentric secondary winding coils are so arranged that desirable tap connections may be made to obtain a reduced voltage for certain purposes without unbalancing the magnetic distribution of the coil turns.

Other objects of the invention will be apparent from the following description of a preferred embodiment thereof, reference being had to the accompanying drawing, in which:

Figure 1 is a diagrammatic view of connections of the primary and secondary winding of a three-phase transformer in which the windings may be arranged in accordance with my invention;

Fig. 2 is a polarity (or vector) diagram of the connections of the winding shown in Fig. 1;

Fig. 3 is a view showing a three-phase core structure with the phase windings on the first and third winding leg being indicated in outline, and a portion of the windings on the middle leg of the core being shown in section and arranged in accordance with my invention;

Fig. 4 is a diagrammatic illustration of the windings shown in Fig. 3 showing the relation between the circuit conductor strands comprising the two halves of the winding; and Fig. 5 is a diagrammatic illustration of the development of the winding shown in Fig. 4.

Referring to the drawing and particularly to Figs. 1 and 2 thereof, $H_1$, $H_2$ and $H_3$ represent three phase conductors of a primary circuit supplying the three-phase primary windings 1, 2 and 3, which are shown connected in delta relation. The three primary windings will be mounted so as to encircle three different winding legs of the three-phase transformer core in a well-known manner, there being associated with each primary winding, a plurality of secondary windings, shown in the illustrated embodiment of the invention as two secondary half-windings. As illustrated, the secondary windings 4 and 5 are associated with the primary winding 1 and are equally coupled with the primary winding 1 and positioned about the same winding leg of the core, the secondary windings 6 and 7, associated with the primary winding 2, are positioned about the same winding leg of the core as the primary winding 2 and equally coupled to the primary winding 2, while the secondary windings 8 and 9 are similarly associated with the primary winding 3 and wound about the same winding leg of the core as the primary winding 3. As indicated in Figs. 1 and 2, the secondary windings of the transformer provide a six-phase circuit consisting of two three-phase Y connected portions.

One of these portions comprises windings 4, 6 and 8 connected between a common neutral point N and three phase conductors A, B and C, respectively. The remaining three secondary windings 5, 7 and 9 are connected between a common neutral point $n$ and three secondary conductors a, b, c, respectively. As is clearly indicated in Fig. 2, the two secondary windings associated with each phase primary winding are equally coupled to that primary winding and are connected in voltage opposition, so that the instantaneous voltages with respect to the neutral point of the winding will be 180 electrical degrees out of phase. Specifically, the winding 4 that is connected between the neutral point N and the phase conductor A and the winding 5 that is connected between the neutral point n and the phase conductor a are in voltage opposition, and this is indicated in Fig. 2 by the fact that the vectors corresponding to the voltages in the windings 4 and 5 are parallel, but extend in opposite directions from the neutral point of their respective Y connected portions. This is true also of the secondary windings 6 and 7 that are equally coupled to the primary winding 2, and also of the secondary windings 8 and 9 that are equally coupled to the primary winding 3.

Referring to Fig. 3, a core structure 11 of magnetic material is illustrated having three vertical winding legs 12, 13 and 14 connected by yoke portions 15 and 16 across their opposite ends comprising a well-known type of three-phase transformer core. Phase windings I, II, III are provided about the three winding leg portions 12, 13 and 14 of the core. The phase winding I includes the windings 1, 4 and 5 positioned about the winding leg 12. The phase windings II include the windings 2, 6 and 7 positioned about the middle winding leg 13 and the phase windings III include the windings 3, 8 and 9 that are positioned about the winding leg 14. Since each set of phase windings I, II and III are similar, only one set is shown in detail, that being the set shown on the middle leg 13 of the core in Fig. 3.

Referring particularly to Figs. 3 and 4, it will be noted that two conductor strands 6 and 7, forming the secondary winding indicated by the same numbers in Figs. 1 and 2 are arranged to form four secondary coils 21, 22, 23 and 24. A group of cylinders of insulating material 20, 25, 26 and 27 are provided for supporting the conductor strands, the strands comprising the coil 21 being wound about the cylinder 20, the strands comprising coil 22 being wound about the cylinder 25 and so on throughout the series of cylindrical coils. The outer cylinder 28 of insulating material supports the primary winding 31 shown as comprising a series of disk type coils 32 that are positioned concentrically about the secondary winding coils 21 to 24, inclusive. The primary winding 31 corresponds to the primary phase winding of a particular phase, such as the phase winding 2 that is associated with the windings 6 and 7.

In Fig. 4 the series of insulating cylinders 20, 25, 26 and 27 are shown diagrammatically with the ends shortened forming a series of steps. This diagrammatic illustration is for the purpose of more clearly showing the sequence of the winding conductors through the several coils of the winding, and does not represent a structural showing of the cylindrical barriers. It will be appreciated that the several cylindrical barriers 20, 25, 26 and 27, and the winding turns of the secondary coils 21, 22, 23 and 24 associated therewith, will normally extend substantially the entire length of the phase winding structure, as shown in Fig. 3.

As shown in Figs. 3 and 4, the two conductor strands 6 and 7 are arranged to be wound as a pair, thus extending through the several coils 21, 22, 23 and 24 in close proximity in each coil. These two strands each represent a half portion of the completed secondary winding of a particular phase. One end of each of these two half portions of the winding is connected to a neutral point, the ends of the conductors that are connected to the two neutral points being at the opposite ends of the coil structure. The remaining, or free ends of the windings, remote from the neutral points, develop voltages in opposite polarity with respect to the neutral points. For example, the strand 7 is shown in Fig. 4 as having its neutral end n at the upper end of the structure, this strand proceeding through coils 21, 22, 23 and 24 in series and terminating at the outer end b which is also shown as positioned at the upper end of the coil structure. This strand is shown in Fig. 4 as a continuous line. On the other hand, the conductor strand 6, which is shown in dotted line in Fig. 4, starting from the neutral end N shown at the bottom end of the coil structure, extends in sequence through the coils 21, 22, 23 and 24, terminating at the outer terminal B, also shown at the bottom of the coil structure in Fig. 4. Throughout each of the several secondary coils, successive turns of the strands 6 and 7 are shown in close proximity, each forming helices closely adjacent with the corresponding turn of the other conductor comprising the pair of conductors that are wound together.

It will also be noted that the relative position of the strands 6 to strand 7 is interchanged in each successive coil 21 to 24. This interchange balances the axial displacement of each helix in each coil 21 to 24 so that no axial displacement exists between the total turns of strands 6 and the total turns of strands 7.

In each of the two windings a tap conductor is connected, the tap T being shown in Fig. 4 as connected to the conductor 6 between the coils 21 and 22 and the tap conductor t being connected to the conductor strand 7 between coils 21 and 22 so that any current drawn from these windings between the points N and T or n and t will represent a load current flowing in the coil 21 only. Since this current flows through the entire length of the portion of the conductor strands comprising the coil 21 and does not flow in any other coil, a balance is maintained between this coil and the remaining coils which would not exist if the tap points existed at some intermediate point along the coil whereby a greater current would flow in one portion of one coil than would flow in another portion thereof. That is to say, by arranging each of the strands 6 and 7, comprising the two half portions of the secondary circuit conductor in the manner described and illustrated, and arranging the tap points T and t between the ends of concentric cylindrical coils of the winding, the magnetic distribution of the winding is not unbalanced when energy is taken from the winding at the low voltage existing between the neutral points and the tapped points of the winding. This construction makes a very economical transformer in that it is not necessary to provide a separate secondary winding coupled to the primary for delivering a relatively small secondary voltage, such as is required for the degassing operation of a rectifier or for similar purposes.

While I have illustrated the invention as comprising the use of a pair of secondary conductor strands in each phase winding, it will be appreciated that any number of pairs of such conductors might be employed and that other numbers of secondary phases than the six-phase connection shown may be provided, such as 12 phases or 24 phases, if desired.

It will also be appreciated that the invention is not limited to the use of inverted Y connected secondary windings, but might use other well-known arrangements of polyphase secondary-windings, such as zig-zag connected secondaries, or inverted delta secondary connections, or a combination of two or more of these to give the required number of secondary voltage polarity patterns desired. In any case, however, pairs of strands of secondary conductors would be interleaved in the form of a series of separate helix shaped winding turns, with the adjacent strands throughout each of the successive turns being closely positioned as illustrated and described.

It will be obvious to one skilled in the art that other modifications of the conductor strands may be made within the spirit of my invention, than the embodiment specifically illustrated, and I do not wish to be limited otherwise than by the scope of the accompanying claims.

I claim as my invention:

1. In a three-phase alternating-current electrical apparatus, a three-phase core structure having three winding legs, a set of phase windings wound about each of the three winding legs, each set of phase windings comprising concentrically arranged inductively related primary and secondary windings, the secondary winding comprising a plurality of concentrically related cylindrical coils having a pair of separate conductor strands, the pair of conductor strands being wound side by side turn after turn to form adjacent cylindrical helix paths throughout each of the several secondary coils of the winding in series, the opposite ends of the two conductor strands being connected to different neutral points so that the remaining opposite ends develop voltages in opposite polarity with respect to the neutral points of the conductor strands so as to form separate half portions of the completed winding, the several conductor strands of the secondary windings of the several phases having a neutral point at one end of the series of secondary coils being connected together in Y relation, and the remaining conductor strands of the several phases having a neutral point at the other end of the series of secondary coils also being connected together in Y relation, the two groups of conductor strands comprising the secondary windings having inverted polarity patterns.

2. In a three-phase alternating-current electrical apparatus, a three-phase core structure having three winding legs, a set of phase windings wound about each of the three winding legs, each set of phase windings comprising concentrically arranged inductively related primary and secondary windings, the secondary winding comprising a plurality of concentrically related cylindrical coils having a pair of separate conductor strands, the pair of conductor strands being wound side by side turn after turn to form adjacent cylindrical helix paths throughout each of the several secondary coils of the winding in series, the opposite ends of the two conductor strands being connected to different neutral points so that the remaining opposite ends develop voltages in opposite polarity with respect to the two neutral points of the conductor strands so as to form separate half portions of the completed winding, the several conductor strands of the secondary windings of the several phases having a neutral point at one end of the series of secondary coils being connected together in Y relation, and the remaining conductor strands of the several phases having a neutral point at the other end of the series of secondary coils also being connected together in Y relation, the two groups of conductor strands comprising the secondary windings having inverted polarity patterns, each of the conductor strands being provided with a tap connection connected to the strand at a point between two of the series connected secondary coils, so as to provide a relatively low voltage source between the tapped point and the neutral point of the conductor strand.

3. In an alternating-current electrical apparatus comprising a plurality of primary windings and a plurality of secondary windings associated with each primary winding, each secondary winding comprising a plurality of concentrically related cylindrical coils each having a cylindrical insulating and supporting barrier, a plurality of separate winding conductor strands wound about the barrier in side by side relation throughout turn after turn of the winding so that each strand follows the path of a cylindrical helix throughout each of the several secondary coils of the winding, one end of each conductor strand being connected to a neutral point, the different conductor strands having different neutral points and connected to form different polarity patterns so that the different secondary windings provide different polarity voltage patterns.

4. In an alternating-current electrical apparatus comprising a plurality of primary windings and a plurality of secondary windings associated with each primary winding, each secondary winding comprising a plurality of concentrically related cylindrical insulating and supporting barriers, a plurality of separate winding conductor strands wound about the barrier in side by side relation throughout turn after turn of the winding so that each strand follows the path of a cylindrical helix throughout each of the several secondary coils of the winding, one end of each conductor strand being connected to a neutral point, the different conductor strands having different neutral points and connected to form different polarity patterns so that the different secondary windings provide different polarity voltage patterns, each of the conductor strands being provided with a tap connection connected to the strand at a point between two of the secondary coils intermediate the ends of the wound conductor strand so as to provide a relatively low voltage source between the tapped point and the neutral point of the conductor strand.

5. In a three-phase alternating-current electrical apparatus, a three-phase core structure having three winding legs, a set of phase windings about each of the three winding legs, each set of phase windings comprising concentrically arranged inductively related primary and secondary windings, the secondary winding comprising a plurality of concentrically related cylindrical insulating and supporting barriers, a pair of separate winding conductor strainds wound about the barrier in side by side relation interleaving the conductor strands throughout turn after turn of the winding so that each strand follows the path of a cylindrical helix throughout each of the several secondary coils of the winding, the several conductor strands of the secondary windings of the several phases having a neutral point at one end of the series of secondary coils being connected together in Y relation, and the remaining conductor strands of the several phases having a neutral point at the other end of the series of secondary coils also being connected together in Y relation, the two groups of conductor strands comprising the secondary windings having inverted polarity patterns.

6. In a three-phase alternating-current electrical apparatus, a three-phase core structure having three winding legs, a set of phase windings about each of the three winding legs, each set of phase windings comprising concentrically arranged inductively related primary and secondary windings, a plurality of concentrically related cylindrical insulating and supporting barriers about each winding leg of the core for accommodating a plurailty of coils comprising the secondary winding associated with the winding leg, a pair of separate winding conductor strands wound to form a plurality of secondary winding coils about the supporting barriers in side by side relation interleaving the conductor strands throughout turn after turn of the winding so that each strand follows the path of a cylindrical helix throughout each of the several secondary coils of the winding, the several conductor strands of the secondary winding of the several phases having a neutral point at one end of the series of secondary coils being connected together in Y relation, and the remaining conductor strands of the several phases having a neutral point at the other end of the series of secondary coils also being connected together in Y relation the two groups of conductor strands comprising the secondary windings having inverted polarity patterns, each of the conductor strands being provided with a tap connection connected to the strand at a point between two of the series connected secondary coils intermediate the ends of the winding so as to provide a relatively low voltage source between the tapped point and the neutral point of the conductor strand.

7. In an alternating-current multi-phase electrical apparatus comprising concentrically arranged inductively related primary and secondary windings, the secondary winding comprising a plurality of concentrically related cylindrical coils having a pair of separate conductor strands, the pair of conductor strands having the same diameter throughout any one of the several cylindrical coils of the winding, the pair of conductor strands being wound side by side turn after turn to form adjacent cylindrical helix paths throughout each of the several secondary coils of the winding in series, the opposite ends of the two conductor strands being connected to two different neutral points so that the remaining opposite ends develop voltages in opposite polarity with respect to the neutral points of the conductor strands so as to form separate half potrions of the completed windng, the consecutive turns of each strand in a coil being interleaved between adjacent turns of the other strand of the pair of strands, the relative positions of the two strands being reversed as the pair of strands advance from one cylindrical coil to the next, so that the relative position of each strand with respect to the other strand of the pair is interchanged in each successive coil of the winding.

8. In an alternating-current multi-phase electrical apparatus comprising concentrically arranged inductively related primary and secondary windings, the secondary winding comprising a plurality of concentrically related cylindrical coils having a pair of separate conductor strands, the pair of conductor strands being wound side by side turn after turn to form adjacent cylindrical helix paths having the same diameter throughout each of the several secondary coils of the winding in series, the opposite ends of the two conductor strands being connected to two different neutral points so that the remaining opposite ends develop voltages in opposite polarity with respect to the neutral points of the conductor strands so as to form separate half portions of the completed winding, each of the conductor strands being provided with a tap connection connected to the strand at a point between two of the series connected secondary coils intermediate the ends of the winding so as to provide a relatively low voltage source between the tapped point and the neutral point of the winding, the consecutive turns of each strand in a coil being interleaved between adjacent turns of the other strand of the pair of strands, the relative positions of the two strands being reversed as the pair of strands advance from one cylindrical coil to the next, so that the relative position of each strand with respect to the other strand of the pair is interchanged in each successive coil of the winding.

9. In a three-phase alternating current electrical apparatus, a three-phase core structure having three winding legs, a set of phase windings wound about each of the three winding legs, each set of phase windings comprising concentrically arranged inductively related primary and secondary windings, the secondary windings comprising a plurality of concentrically related cylindrical coils having a pair of separate conductor strands forming separate secondary winding circuits, the pairs of conductor strands being wound side by side turn after turn to form adjacent cylindrical helix paths having the same diameter throughout each of the several secondary coils of the winding in series, the opposite ends of the two conductor strands being connected to different neutral points so that the remaining opposite ends develop voltages in opposite polarity with respect to the neutral points of the conductor strands so as to form separate half portions of the completed winding, the several conductor strands of the secondary windings of the several phases having a neutral point at one end of the series of secondary coils being connected together in Y relation, and the remaining conductor strands of the several phases having a neutral point at the other end of the series of secondary coils also being connected together in Y relation, the two groups of conductor strands comprising the secondary windings having inverted polarity patterns, the consecutive turns of each strand in a coil being interleaved between adjacent turns of the other strand of the pair of strands, the relative positions of the two strands being reversed as the pair of strands advance from one cylindrical coil to the next, so that the relative position of each strand with respect to the other strand of the pair is interchanged in each successive coil of the winding.

10. In a three-phase alternating-current multi-phase electrical apparatus, a three-phase core structure having three winding legs, a set of phase windings wound about each of the three winding legs, each set of phase windings comprising concentrically arranged inductive related primary and secondary windings, the secondary windings comprising a plurality of concentrically related cylindrical coils having a pair of separate conductor strands forming separate secondary winding circuits, the pair of conductor strands being wound side by side turn after turn to form adjacent cylindrical helix paths throughout each of the several secondary coils of the winding in series, the pair of conductor strands having the same diameter throughout any one of the several cylindrical coils of the winding, the opposite ends of the two conductor strands being connected to different neutral points so that the remaining opposite ends develop voltages in opposite polarity with respect to the neutral points of the conductor strands so as to form separate half portions of the completed winding, the several conductor strands of the secondary windings of the several phases having a neutral point at one end of the series of secondary coils being connected together in Y relation, and the remaining conductor strands of the several phases having a neutral point at the other end of the series of secondary coils also being connected together in Y relation, the two groups of conductor strands comprising the secondary windings having inverted polarity patterns, each of the conductor strands being provided with a tap connection connected to the strand at a point between two of the series connected coils intermediate the ends of the winding so as to provide a relatively low voltage source between the tapped point and the neutral point of the conductor strand, the consecutive turns of each strand in a coil being interleaved between adjacent turns of the other strand of the pair of strands, the relative positions of the two strands being reversed as the pair of strands advance from one cylindrical coil to the next, so that the relative position of each strand with respect to the other strand of the pair is interchanged in each successive coil of the winding.

11. In an alternating-current electrical apparatus comprising a plurality of phase groups of concentrically arranged primary and secondary windings, each secondary winding comprising a plurality of concentrically related cylindrical coils each having a cylindrical insulating and supporting barrier, a plurality of separate winding conductor strands wound about the barrier in side by side relation throughout turn after turn of the winding so that each strand follows the path of a cylindrical helix throughout each of the several secondary coils of the winding, one end of each conductor strand being connected to a neutral point, the different conductor strands having different neutral points and connected to form different polarity patterns so that the different secondary windngs formed from the different conductor strands provide different polarity voltage patterns, the consecutive turns of each strand in a coil being itnerleaved between adjacent turns of the other strands, the relative positions of the strands being reversed as the strands advance from one cylindrical coil to the next, so that the relative position of each strand with respect to the other strands is interchanged in each successive coil of the winding so as to balance the axial displacement of each helix in each coil of the winding.

12. In an alternating current electrical apparatus comprising a plurality of phase groups of concentrically arranged primary and secondary windings, each secondary winding comprising a plurality of concentrically related cylindrical insulating and supporting barriers and a plurality of separate winding conductor strands wound about the barrier in side by side relation throughout turn after turn of the winding so that each strand follows the path of a cylindrical helix throughout each of the several secondary coils of the winding, one end of each conductor strand being connected to a neutral point, the different conductor strands having different neutral points and connected ot form different polarity patterns so that the different secondary windings formed from the different conductor strands provide different polarity voltage patterns, each of the conductor strands being provided with a tap connection connected to the strand at a point between two of the series connected secondary coils intermediate the ends of the winding so as to provide a relatively low voltage source between the tapped point and the neutral point of the conductor strand, the consecutive turns of each strand in a coil being interleaved between adjacent turns of the other strands, the relative positions of the strands being reversed as the strands advance from one cylindrical coil to the next, so that the relative position of each strand with respect to the other strands is interchanged in each successive coil of the winding.

13. In a three-phase alternating-current electrical apparatus, a three-phase core structure having three winding legs, a set of phase windings about each of the three winding legs, each set of phase windings comprising concentrically arranged inductively related primary and secondary windings, a plurality of concentrically related cylindrical insulating and supporting barriers about each winding leg of the core for accommodating a plurality of coils comprising the secondary winding associated with the winding leg, a pair of separate winding conductor strands wound to form a plurality of secondary winding coils about the supporting barriers in side by side relation interleaving the conductor strands throughout turn after turn of the winding so that each strand follows the path of a cylindrical helix throughout each of the several secondary coils of the winding, the several conductor strands of the secondary windings of the several phases having a neutral point at one end of the series of secondary coils being connected together in Y relation, and the remaining conductor strands of the several phases having a neutral point at the other end of the series of secondary coils also being connected together in Y relation, the two groups of conductor strands comprising the secondary windings having inverted polarity patterns, the consecutive turns of each strand in a coil being itnerleaved between adjacent turns of the other one of the pair of strands, the relative positions of the two strands being reversed as the pair of strands advance from one cylindrical coil to the next, so that the relative position of each strand with respect to the other strand of the pair is interchanged in each successive coil of the winding.

FRANCIS D. KAISER.

REFERENCES CITED

The following references are of record in the file of this patent:

UNITED STATES PATENTS

| Number | Name | Date |
|---|---|---|
| 489,277 | Varley | Jan. 3, 1893 |
| 1,386,828 | Winston | Aug. 9, 1921 |
| 1,629,462 | Palueff | May 17, 1927 |
| 2,374,029 | Maslin | Apr. 17, 1945 |